March 26, 1963     HIDEO MIYAUCHI     3,082,971
MOTION PICTURE FILM REWINDING DEVICE
Filed April 25, 1960     2 Sheets-Sheet 1

INVENTOR.
HIDEO MIYAUCHI
BY Stanley Welder
ATTORNEY

March 26, 1963
HIDEO MIYAUCHI
3,082,971
MOTION PICTURE FILM REWINDING DEVICE
Filed April 25, 1960
2 Sheets-Sheet 2
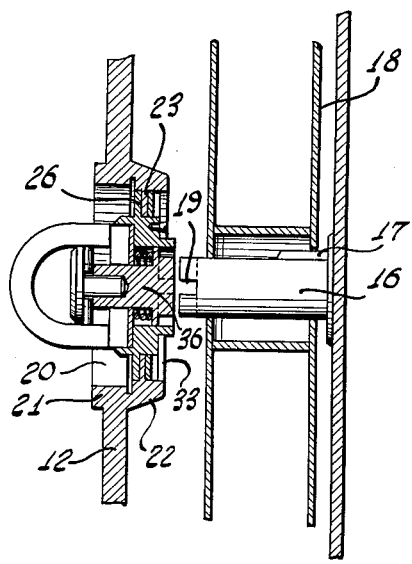
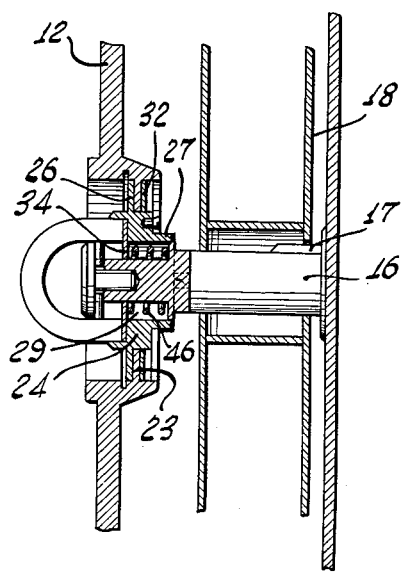
INVENTOR.
HIDEO MIYAUCHI
BY Stanley Wald
ATTORNEY United States Patent Office 3,082,971
Patented Mar. 26, 1963

3,082,971
MOTION PICTURE FILM REWINDING DEVICE
Hideo Miyauchi, Okaya-shi, Nagano-ken, Japan, assignor to Yashica Co., Ltd., Tokyo, Japan, a corporation of Japan
Filed Apr. 25, 1960, Ser. No. 24,282
Claims priority, application Japan May 2, 1959
2 Claims. (Cl. 242—71.3)

The present invention relates generally to improvements in cameras and it relates more particularly to an improved film rewinding mechanism in a motion picture camera.

In the conventional motion picture camera for amateur use the take up reel is positively driven and the feed reel is usually free running and is mounted on an axle or spindle about which it freely rotates. However, in order to produce overlap photographic sequences it is necessary to rewind a section of the film which has been exposed in a fade-out sequence so that it may be exposed to the overlapping fade-in sequence. The arrangements heretofore provided in motion picture cameras for rewinding measured lengths of film are somewhat complex and bulky and do not readily lend themselves to amateur type cameras.

It is therefore a principal object of the present invention to provide an improved motion picture camera.

Another object of the present invention is to provide an improved motion picture camera having a film rewind mechanism.

Still another object of the present invention is to provide in a motion picture camera a film rewind mechanism which is simple to operate and is not subject to accidental misuse or interference with the normal operation of the camera.

A further object of the present invention is to provide an improved film rewind mechanism of the above nature characterized by its simplicity, compactness, ruggedness and low cost.

The above and other objects of the present invention will become apparent from a reading of the following description taken in conjunction with the accompanying drawings wherein:

FIGURE 2 is an enlarged detail transverse sectional view of the film rewinding mechanism illustrated in an inoperative position;

FIGURE 3 is a view similar to FIGURE 2, the rewinding mechanism being illustrated in operative position.

Figure 1:
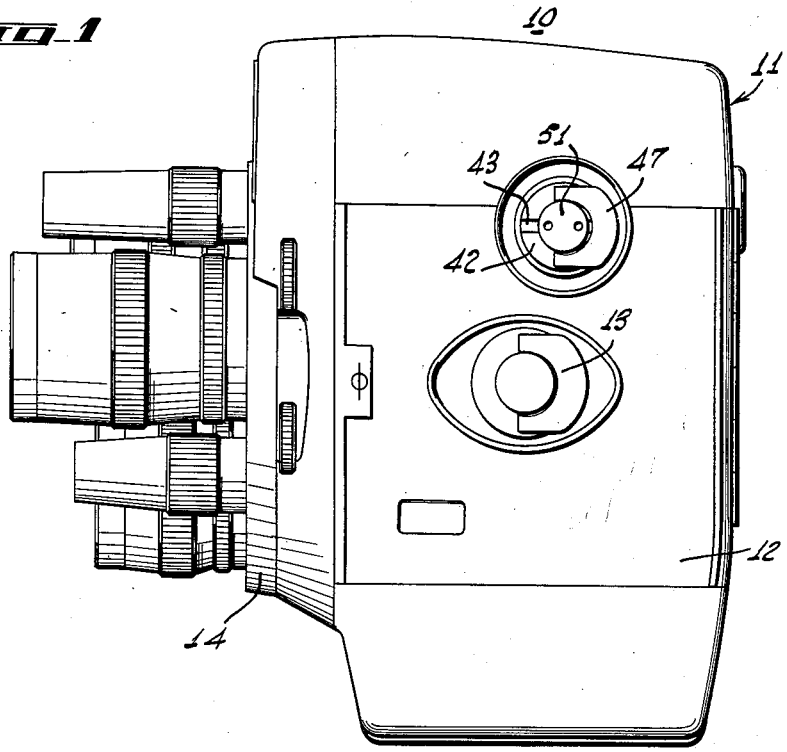
FIGURE 1 is a side elevational view of a motion picture camera provided with the present improved film rewinding mechanism.
Figure 4:
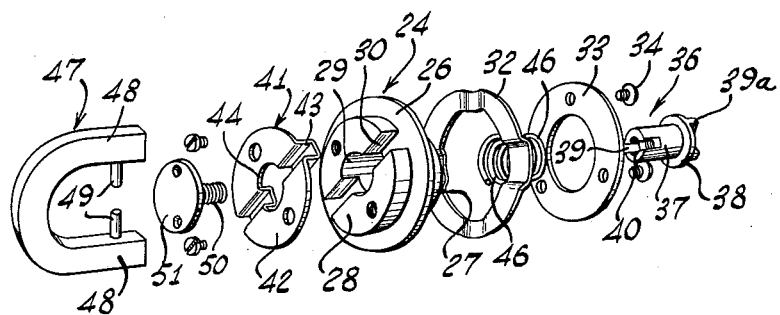
FIGURE 4 is an exploded perspective view of the film rewind device.

In a sense the present invention contemplates the provision in a motion picture camera of a freely rotatable shaft adapted to support and engage a reel, a rotatable coupling element longitudinally axially movable between an advanced position engaging said shaft and a retracted position out of engagement with said shaft and a finger piece connected to said coupling element and axially and rotatably movable therewith.

According to a preferred form of the present invention the reel engaging shaft is slotted at its free end and the coupling element is correspondingly ridged and axially slidably registers with a bushing rotatably carried by the door of the camera casing. A spring normally urges the coupling element into engagement with the reel carrying shaft. The finger piece is mounted at the outer free end of the coupling element and is swingable between an extended and collapsed position. When the finger piece is in collapsed position the coupling element is locked in its retracted position and when the finger piece is extended the coupling element is released into engagement with the reel shaft.

Referring now to the drawings which illustrate a preferred embodiment of the present invention, the reference numeral 10 generally designates a motion picture camera incorporating the improved rewinding mechanism. The camera 10 includes a main casing 11 having a door or lid 12 hinged along its rear edge to the back wall of the casing 11 and provided with a latch member 13 which releasably locks the door 12 in closed position. Mounted in the casing front wall is a multilens turret head 14 and housed in the casing 11 is any well known shutter mechanism, film takeup and advance arrangement and a viewable bidirectional film counter (not shown).

Located on the casing 11 and accessible through the open door 12 is a suitably supported freely rotatable free ended shaft 16 provided at its base with a longitudinally extending ridge or spline 17. A conventional film reel 18 is removably carried by the shaft 16 and includes a hub section having axially aligned openings formed therein, at least one of the openings being provided with a radial slot which engages the spline 17 so that the reel 18 is rotatable with the shaft 16. The free end of the shaft 16 has a pair of diametrically extending grooves 19 formed therein and arranged in quadrature.

A circular opening 20 is formed in the door 12 and is coaxial with shaft 16 when the door 12 is closed. Surrounding the opening 20 is an outwardly directed lip 21 and an inwardly directed lip 22, the lip 22 being provided on its inner face with an annular peripheral flange 23.

Rotatably registering with the opening 20 is a bushing 24 having a peripheral flange 26 abutting the outer face of the flange 23, and an inwardly directed hub section 27 and an outer circular section 28. An axial bore 29 extends through the bushing 24 and a diametrically extending groove 30 is formed in the outer section 28. A spring washer 32 having raised and depressed portions abuts the inner face of the flange 23. Overlying the washer 32 is an annulus 33 which registers with the bushing hub 27 and opening 20 and is secured to the end face of the hub 27 by screws 34 passing through openings in the annulus 33 and engaging tapped bores in the hub 27 to effect a neat rotatable assembly of the bushing 24 in the opening 20.

A coupling element 36 includes a shank 37 axially registering with the bushing bore 29 and a circular base 38 provided with forwardly directed diametrically extending ridges 39a arranged in quadrature and adapted to releasably engage the shaft grooves 19. The trailing end of the shank 37 has a diametrically extending slot 39 and a tapped axial bore 40 formed therein.

A cap member 41 overlies the bushing section 28 and includes a pair of semicircular wings 42 which abut the end faces of the bushing section 28 and a channel shaped bridge section which nests in the bushing slot 30 and connects the wings 42. A circular opening 44 is formed in the cap 41 and is of less diameter than the bushing bore 29 and of slightly greater diameter than the shank 37. The cap 41 is affixed to the bushing 24 by a pair of screws registering with openings in the wings 42 and engaging corresponding tapped bores in the bushing 24. A helical compression spring 46 surrounds the shank 37 and is disposed in the bushing bore 29 and is entrapped between the confronting faces of the cap bridge section 43 and the coupling member base 38 to urge the coupling member forwardly toward its advance position.

A manipulatable finger piece 47 is of substantially U-shaped configuration and includes a pair of parallel legs 48 carrying opposite inwardly directed coaxial pins 49 which are located above the ends of the legs 48. The finger piece 47 is disposed on the outer face of the door 12, the pins 49 rotatably engaging the shank slot 39. The finger piece 47 is affixed to the coupling element 36 by a large flat headed screw 50 which engages the shank tapped bore 40, the disc shaped screw head 51 closing the top opening of the slot 39 to lock the finger piece 47 in a swingable position on the coupling element 36. It should be noted that the thickness of the finger piece legs 48 permits the slidable nesting of the ends thereof in the channel 43. Furthermore, the position of the pins 49 are such as to permit the swinging thereabout of the finger piece 47 to a flat position along the face of the door 12 when the coupling element 36 and the finger piece 47 are retracted.

Considering now the employment of the improved rewind mechanism described above, in the normal operation of the camera the coupling element 36 is retracted and disengaged from the shaft 16, as illustrated in FIGURE 2 of the drawing. The coupling element is releasably locked in its retracted position by rotating the finger piece 47 out of alignment with the channel 43 and swinging it to a flat position on the face of the door 12 as illustrated in FIGURE 1. In order to effect a rewinding operation the finger piece 47 is rotated and swung upwardly to bring the legs 48 thereof into alignment with the channel 43, the spring 46 thereupon urging the coupling member 36 and finger piece 47 forwardly and the legs 48 into registry with the channel 43. If the ridges 39a are in alignment with the shaft grooves 19 the coupling member will be urged into mating engagement with the shaft 16. If such registry is not immediately effected the slight turning of the finger piece and coupling element will bring the grooves 19 and ridges 39a into proper registry to effect the full mating engagement of the shaft and coupling element as illustrated in FIGURE 3 of the drawing. The finger piece 47 is then turned to rewind the film the desired amount as indidated by the frame counter thereby facilitating overlap sequences and other camera operations. After the desired length of film has been rewound, the camera may be returned to normal operation by raising the finger piece 47 to effect the disengagement of the shaft 16 and coupling member 36, and positioning the finger piece in its flat lock position as aforesaid.

While there has been described and illustrated a preferred embodiment of the present invention it is apparent that numerous alterations omissions and additions may be made without departing from the spirit thereof.

What is claimed is:

1. In a motion picture camera including a casing having a reel receiving cavity and provided with a side wall defining a hinged door swingable between a closed position and an open position affording access into said cavity and a freely rotatable reel engaging shaft disposed in said cavity and supported at one end thereof and having a longitudinal axis substantially perpendicular to the plane of said door when said door is in said closed position, said door having a circular aperture formed therein coaxial with said shaft when said door is in said closed position, a bushing rotatably registering with and projecting through said circular aperture and mounted on said door, said bushing having formed therein a longitudinal axial bore and a transverse groove in its outer face, a coupling element axially registering with said bushing longitudinal bore and slidable therein between an advanced position engaging said shaft and a retracted position, spring means normally urging said coupling element toward its advanced position, a substantially U-shaped finger piece having side arms and disposed on the outer face of said bushing, and a pair of pivot pins mounted on and directed toward each other from said side arms at points rearward of the free ends thereof and engaging said coupling element, said finger piece being swingable between an outwardly projecting extended position and a lie-flat position, said coupling element being retained in said retracted position by said pivot pins when said finger piece is in said lie-flat position, and the ends of said finger piece side arms being axially slidably registrable with said bushing transverse groove when said finger piece is in said extended position to permit the movement of said coupling element to said shaft engaging advanced position.

2. In the camera of claim 1 an outwardly directed peripheral flange formed on said bushing and overlying the outer face of said door, an annulus affixed to said bushing and disposed opposite the inner face of said door, and a spring washer entrapped between the confronting faces of said door and said annulus.

References Cited in the file of this patent

UNITED STATES PATENTS

| | | |
|---|---|---|
| 1,023,933 | Folmer | Apr. 23, 1912 |
| 1,243,270 | Dietz | Oct. 16, 1917 |
| 2,008,110 | Scheibell | July 16, 1935 |
| 2,245,214 | Mihalyi | June 10, 1941 |
| 2,391,497 | Wilson et al. | Dec. 25, 1945 |

FOREIGN PATENTS

| | | |
|---|---|---|
| 516,507 | Germany | Jan. 24, 1931 |
| 854,711 | Great Britain | Nov. 23, 1960 |